Figure 1:
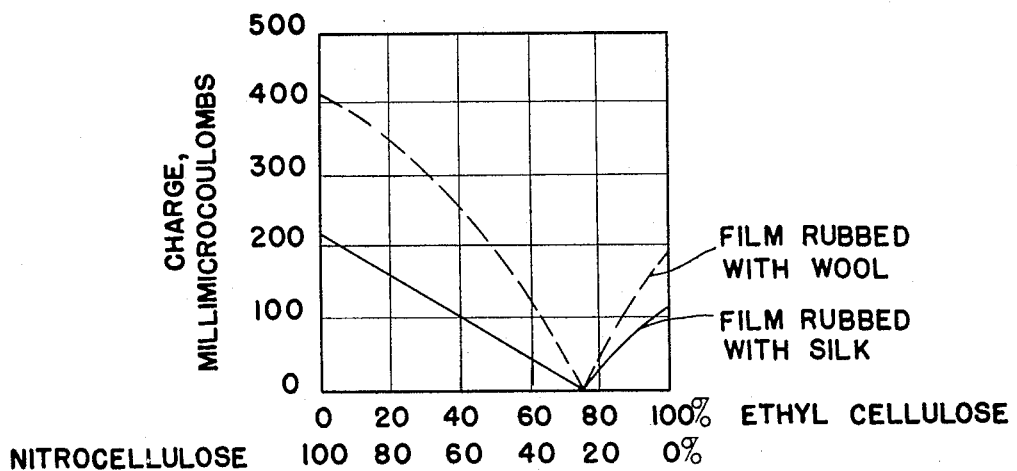

July 20, 1943.                J. K. SPEICHER                2,324,887
                            STATIC-FREE SHEETING
                            Filed Dec. 20, 1940

JOHN K. SPEICHER
INVENTOR.

BY  Cleveland B. Hollabaugh

UNITED STATES PATENT OFFICE 2,324,887

STATIC-FREE SHEETING

John K. Speicher, Newark, Del., assignor to Hercules Powder Company, Wilmington, Del., a corporation of Delaware Application December 20, 1940, Serial No. 370,922

10 Claims. (Cl. 106—169)

This invention relates to cellulosic films or sheeting and more particularly it relates to cellulosic films or sheeting free from the defect of taking a static electric charge.

Cellulose derivative sheeting is characterized by the undesirable property of becoming statically charged in use. The electrical charge is generated by rubbing of the film or sheeting incidental to its use, and is, in fact, produced by the ordinary handling of the material, i. e., by the normal operations of formation, rolling and unrolling, coating and other processing, or use in wrapping. In the case of photographic film, electrical discharges frequently cause the formation of lines or foggy areas on the film. Furthermore, the static charge causes film and sheeting to be attracted by passing objects or to stick thereto causing tearing of the film or sheeting and collection of dust. As a result, cellulose derivative foil or sheeting is limited in application in packaging. In addition, sparks caused by static charges may cause dangerous fires.

Much effort has been devoted to overcoming the tendency of cellulose derivative films to become charged. Hydroscopic agents have been incorporated in films or coated thereon. However, this produces an unstable material sensitive to atmospheric conditions and in many cases causes stickiness and other undesirable properties. Composite films have been suggested consisting of several layers of different materials. These curl due to differential shrinkage and expansion of the several layers. Various mixtures of cellulose derivatives have also been suggested. However, all these proposals have at most mitigated the evil of the static charge. None of them have overcome it to the point where tearing of film or sheeting, for example in processing equipment and packaging machinery, and the tendency to pick up and hold dust particles and fibre are eliminated.

It is an object of this invention to provide a tough cellulosic film or sheeting which does not become statically charged in use. It is a further object to provide photographic film which does not become charged statically during the operations of preparation and normal handling. It is a still further object to provide tough, self-supporting sheeting, for example, wrapping foil of a cellulosic character which takes substantially no static charge upon rolling, unrolling, rubbing, processing, machine wrapping, handling, etc., in use. It is also an object to provide such sheeting in a homogeneous form, rather than in a multilayer form, to insure a minimum of curling and expedience in preparation. Other objects will become apparent as this invention is described.

Now in accordance with this invention these objects are attained by film, foil, or other sheeting comprising ethyl cellulose and, intimately admixed and colloided therewith, a quantity of nitrocellulose such that the combination is devoid of the ability to take and hold a static charge. Ethyl cellulose films are, as is well known, similar to films of other cellulose derivatives in that upon being rubbed with silk or wool, or upon being rolled or unrolled or otherwise handled in a moderately dry atmosphere, they assume a definitely noticeable charge. Nitrocellulose, as is well known, is notorious with respect to the ease with which it picks up a very high static charge. It has now been found that in spite of these properties of the individual components, it is possible to obtain a film wholly devoid of ability to become statically charged by certain proportions of the two derivatives.

The film or sheeting in accordance with this invention will comprise an intimate mixture of ethyl cellulose and nitrocellulose homogeneously interdispersed or commonly colloided in the proportion of from 70 parts to about 90 parts of ethyl cellulose and from about 10 parts to about 30 parts by weight of nitrocellulose. Usually the sheeting or film will comprise between about 75 parts and about 85 parts by weight of ethyl cellulose and between about 15 parts and about 25 parts by weight of nitrocellulose. It will be understood that in stating these proportions of nitrocellulose and ethyl cellulose, it is intended that the sum of ethyl cellulose and nitrocellulose shall total 100 parts. In addition to the nitrocellulose and ethyl cellulose, the film or sheeting may comprise modifying agents of the plasticizing type, coloring matter, etc. It will be understood, however, that this invention refers to flexible, tough sheeting or film which is fully capable of supporting itself and of being handled and used as such, i. e., in the form of a free film unsupported by backing and capable of being processed, handled, and used in the form of sheets or continuous webs. The film or sheeting in accordance with this invention is characterized by the ability to be folded repeatedly along the same line without breaking.

The ethyl cellulose utilized will be of a type soluble in organic solvents and compatible with nitrocellulose; it will have an ethoxyl content between about 40% and about 53%, preferably between about 44% and about 49%. It will be of the relatively high viscosity type capable of forming flexible, self-supporting films of sufficient toughness for practical utility in photographic film and wrapping foil. The ability to withstand handling is measured by the behavior of films of the ethyl cellulose in a Schopper fold tester. Ethyl cellulose to be utilized in the sheeting according to this invention will have a Schopper fold value of at least about 110 double folds before breaking, the film tested being 0.0039–0.0041 inch thick and the fold value being the average value for 20 individual tests on good uniform strips of film. The ethyl cellulose will have a viscosity above about 90 centipoises, preferably between about 110 and about 240 centipoises in 5% solution.

The nitrocellulose will be of a type soluble in organic solvents and compatible with the ethyl cellulose; it will have a nitrogen content between about 10.9% and about 12.6%, preferably between about 11.4% and about 12.2%. The nitrocellulose will be of a relatively tough flexible type. Its viscosity will be above about 4 seconds, preferably in the range between about 15 and about 100 seconds.

It has been found that for each particular lot of ethyl cellulose and each particular lot of nitrocellulose there is a certain proportion in which an intimate mixture of the two materials in the form of film or sheeting is incapable of taking a static charge as by handling, rolling and unrolling, rubbing with silk, wool, etc. It has been found that this definite proportion lies within the rather narrow range of compositions hereinabove mentioned. However, the proportion of the two derivatives which gives a film which is incapable of taking a static charge appears to vary somewhat within the ranges mentioned from lot to lot of the material, and it also varies when the film is modified by the addition of plasticizing ingredients. The reasons for this variation are unknown but it appears that the differences in lot to lot of ethyl cellulose and nitrocellulose, i. e., such differences as the source of the cellulose, the viscosity characteristic of the material, the degree of substitution of the material, etc., exert an influence on electrical chargeability. Likewise, there is variation in the proportions giving a static-free film when plasticizing materials are added, the variation depending upon the nature of the added material, i. e., the proportions of ethyl cellulose to nitrocellulose giving optimum results vary somewhat with the kind and quantity of plasticizer incorporated in the film or sheeting.

The peculiarities of ethyl cellulose-nitrocellulose mixtures in the form of film and the variation in the ability to take a static charge from lot to lot are illustrated by the drawing. The three figures of the drawing are curves in which the static charges generated by standard procedures are plotted against the proportions of nitrocellulose and ethyl cellulose in three series of films.

Figure 2:
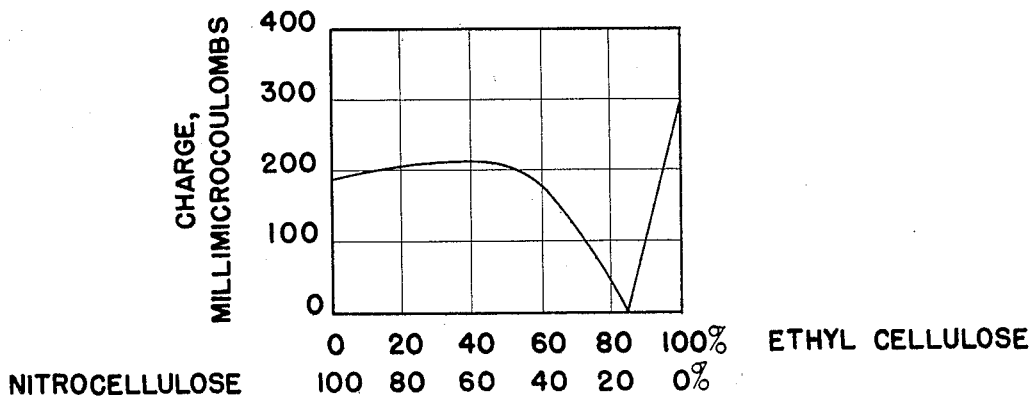
Figure 3:
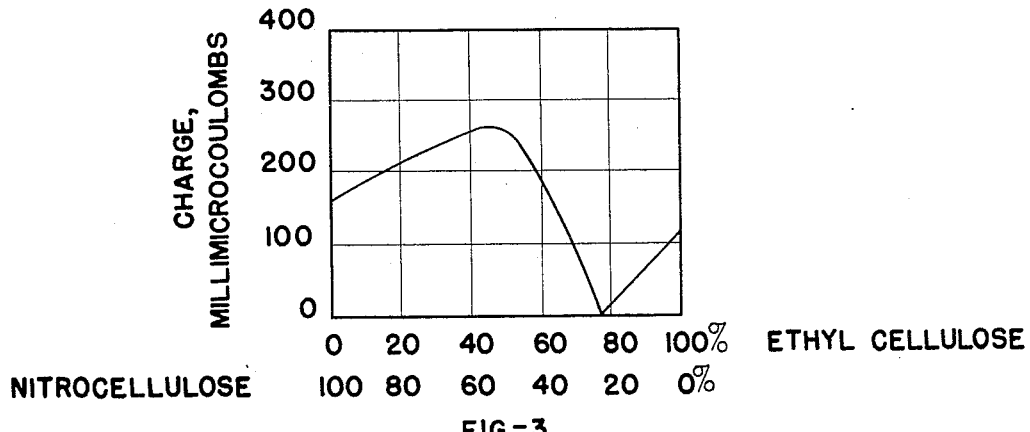

Figure 1 shows the relative size of the static charges which may be generated by rubbing films composed of various mixtures of ethyl cellulose and nitrocellulose with wool and also with silk. In obtaining the curves shown in Figure 1, the procedure of rubbing the film was carefully standardized so as to eliminate variation from test to test. It will be noted in Figure 1 that at 76% ethyl cellulose and 24% nitrocellulose the film tested took no charge, and that this unexpected property was apparent for rubbing with both silk and wool. The curves of Figure 2 show the extent of the charges generated on a series of films prepared from two additional lots of ethyl cellulose and nitrocellulose. In this case, the optimum film, i. e., the film incapable of taking the static charge, had a composition of 85% ethyl cellulose and 15% nitrocellulose. Figure 3 shows results on still another set of films made with further lots of ethyl cellulose and nitrocellulose. In this case optimum results were attained in the proportion of 77 parts of ethyl cellulose to 23 parts of nitrocellulose.

It will be appreciated from an examination of the three figures of the drawing that while perfect films, i. e., films unable to take a static charge are obtainable and can be predicted as to compositions within a fairly narrow range; yet the exact proportion of the ingredients cannot be exactly predicted. The variation which may be expected in the static properties of films prepared from different lots of ethyl cellulose and nitrocellulose is illustrated by the data given in Table I. It will be noted that in all cases, the films of Table I consist of 80 parts of ethyl cellulose and 20 parts of nitrocellulose. In all cases, the films were rubbed with wool to develop as much of a charge as the films would take. The films were very nearly static free; yet it is seen that variations were obtained.

TABLE I

*Static electricity generated on mixed ethyl cellulose-nitrocellulose films. Results expressed in millimicrocoulombs for 40 sq. in.*

| Film number | 1 | 2 | 3 | 4 | 5 | 6 | 15 |
|---|---|---|---|---|---|---|---|
| Ethyl cellulose (48.0% EtO—200 cp. viscosity) | 80 | 80 | | | | | 80 |
| Ethyl cellulose (43.8% EtO—100 cp. viscosity) | | | 80 | | | | |
| Ethyl cellulose (50.3% EtO—100 cp. viscosity) | | | | 80 | | | |
| Ethyl cellulose (47–48% EtO—100 cp. viscosity) | | | | | 80 | 80 | |
| Nitrocellulose (10.9% $N_7$—50 sec.) | 20 | | | | | | |
| Nitrocellulose (4 sec. viscosity—12% nitrogen) | | 20 | | | | 20 | |
| Nitrocellulose (36 sec. viscosity—12% nitrogen) | | | 20 | 20 | 20 | | 20 |
| Charge generated (millimicrocoulombs) | 0 | +78 | +78 | +88 | −25 | +18 | +58 |

Films comprising ethyl cellulose and nitrocellulose in the ranges hereinabove mentioned will in general have a very low chargeability and thus give little or no static difficulties in use. However, it may be desirable to proceed so as to prepare films which are naturally incapable of taking and holding substantially any charge of static electricity. In order to prepare such perfect static-free film from any single batch of ethyl cellulose and any single batch of nitrocellulose, it is advisable to determine the properties of films of various mixtures by a routine of testing to enable selection of the optimum proportions. This routine comprises preparing a series of films covering the range of proportions of ethyl cellulose and nitrocellulose hereinbefore mentioned in increments of, say 1% of ethyl cellulose; i. e., films containing 70% ethyl cellulose, 71% ethyl cellulose, 72% ethyl cellulose, 73% ethyl cellulose, and so forth, up to 90% ethyl cellulose, the remainder being nitrocellulose, are prepared by any film forming procedure. If desired, the film may be prepared in 2% increments for less precise operation, instead of in 1% increments. The ability of the films so prepared to take and hold a static charge is then measured by some standardized procedure, for example, the following. Chargeability of film or sheeting is conveniently measured by placing a small sheet of film having some fixed area such as 40 sq. in. upon a grounded metal plate such as a flat brass plate which has been covered by an insulator such as a sheet of heavy paper and rubbing the film (10 in. x 4 in. in size) with a thick woolen cloth covered by a flat glass disk, say 4 in. in diameter weighted to a fixed weight such as 1500 grams. A fixed number of strokes, say 10 strokes, are made with the wool covered disk, stroking in one direction only, each stroke being 10 in. long as a standard length of stroke. This procedure, using the specific figures given, leads to the static data given herein.

After rubbing, the film is quickly placed in an insulated container. The charge on the container is then measured by means of a condenser and electroscope or other means well known to the art. The result may be expressed as the number of millimicrocoulombs charge obtained on an area of 40 sq. in. The result of the test on the series of films may be plotted in a curve like that of Figure I and clearly shows the optimum composition to give a film which for all practical purposes is incapable of absorbing a charge of static electricity of sufficient magnitude to be discernible in use. This optimum composition is the "point of static neutrality," at which the film is substantially incapable of taking a charge. Film or sheeting having the optimum composition so determined is then prepared for use. It will be understood deviations may be made in this procedure, for example, using silk or hair instead of wool, as long as a standard procedure is followed.

Ethyl cellulose sheeting, whether intended for use in photographic films or for wrapping and other purposes, may be formulated with plasticizers, such as, for example, dibutyl phthalate, diamyl phthalate, triethyl citrate, tricresyl phosphate, triphenyl phosphate, methyl phthalyl ethyl glycollate, methyl hydroabietate, refined mineral oil, castor oil, and similar compatible substances. Such materials will comprise less than 35% of the film or sheeting. It has been found that plasticizers have the effect of altering the optimum proportion of ethyl cellulose and nitrocellulose for obtaining substantially static-free film. The effect of the plasticizer varies with the particular plasticizer employed and with the quantity of the plasticizer employed. The effect of a plasticizer may be illustrated by the data presented in Table II.

TABLE II

*Static electricity generated on mixed ethyl cellulose-nitrocellulose films. Results expressed in millimicrocoulombs for 40 sq. in.*

| Film number | 7 | 8 | 9 | 10 | 11 | 12 |
| --- | --- | --- | --- | --- | --- | --- |
| Ethyl cellulose (48.0% EtO—200 cp. viscosity) | 80 | 80 | 80 | 80 | 80 | 80 |
| R. S. 30–40 nitrocellulose (36 sec. viscosity—12% nitrogen) | 20 | 20 | 20 | 20 | 20 | 20 |
| Triphenyl phosphate | 17.7 | | | | | 43 |
| Dibutyl phthalate | | 17.7 | | | | 43 |
| Refined mineral oil (Nujol) | | | 17.7 | | | |
| Raw castor oil | | | | 17.7 | | |
| Static charge generated | 0 | +59 | Above 100 | Above 100 | Above 100 | 100+ |

It will be noted that triphenyl phosphate and dibutyl phthalate had very little effect when utilized in the moderate quantity usually desirable for sheeting, but that their effect was increased somewhat when used in abnormally large quantities. The mineral oil and castor oil exerted a fairly strong influence in moderate quantities.

To obtain substantially static-free films utilizing a plasticizer, it is necessary first to determine the quantity of the particular plasticizer to be utilized which will impart the physical properties desired in the film. This is readily determined by noting the softness imparted to say a 75–25 ethyl cellulose-nitrocellulose film by inclusion of the plasticizer and represents a step well known in the art. For example, film No. 7 of Table II represents a film in which 17.7 parts of triphenyl phosphate per 100 parts cellulose derivative mixture, was found suitable. A series of films is then prepared from the particular lots of ethyl cellulose and nitrocellulose to be utilized, however, in this case, including the plasticizer, and the optimum proportion of ethyl cellulose and nitrocellulose is determined in the same manner as has been described for unplasticized films.

It has been found that where a particular plasticizer in a particular quantity causes a film to take a positive charge upon being rubbed with wool, silk, or similar material, the size of the charge will be decreased, and may be adjusted to substantially zero, by increasing the nitrocellulose content of the film and correspondingly decreasing the ethyl cellulose content. Thus, referring to Table II, the film containing dibutyl pythalate may be made to be incapable of making a charge by adjustment of its ethyl cellulose-nitrocellulose ratio to 78 to 22 for the lower proportion of dibutyl phthalate and to 76 to 24 for the higher proportion. Where the oil is utilized the ethyl cellulose-nitrocellulose ratio will be adjusted to from about 70–30 to about 73–27 to obtain substantially static-free film. In general, where film is capable of taking a positive charge, the use of more nitrocellulose will correct the defect, and conversely where a film is capable of taking a negative charge, the use of more ethyl cellulose improves the film.

The tough self-supporting free film, foil, or other sheeting of this invention may be prepared by casting solutions of the components of the sheeting in a volatile solvent or solvent mixture on a smooth surface and permitting the volatile solvents to evaporate. A pool of mercury, a smooth plate, or a film casting wheel or belt may be used. The volatile solvent may be any common solvent of the film components. A mixture of, for example, 20–60% of an alkyl ester of a lower aliphatic acid or of a lower ketone, 5–25% of a lower alkyl alcohol, and 30–60% of a hydrocarbon diluent preferably aromatic, is suitable. For example, a solvent mixture consisting of 44% butyl acetate, 44% toluene, and 12% ethanol is suitable; a solvent mixture consisting of about 35% ethyl acetate, 50% of toluene, and 15% of ethanol furnishes another example.

The sheeting in accordance with this invention may be in the form of wrapping foil, usually of a thickness between about 0.0005 and about 0.002 inch, or in thicker, more rigid form, it may serve as a supporting base for a photographic emulsion. It will be appreciated that this invention is not limited in scope to sheeting which is incapable of taking up any static charge upon being rubbed, although its preferred embodiment represents an outstanding product which takes substantially no static charge. It also provides very useful sheeting which may take up a small charge which is much smaller numerically and very much less disadvantageous than charges taken up by previous sheeting. It has been found that the forces of attraction caused by static electricity which cause tearing, picking up of dust, and other difficulties in the use of cellulosic sheeting vary about as the square of the actual charge upon the sheeting. Thus, a 90% reduction in the charge which the sheeting is capable of picking up represents about 99% reduction in the forces caused by the static charge (one-tenth charge=one-hundredth force); similarly a reduction to one-third in static charge represents a reduction to one-ninth of the forces caused by static. Hence, it will be seen that films and sheeting prepared according to this invention will be practically free of the disadvantages of static, even though they are not adjusted to the composition which is incapable of taking any charge. Sheeting in accordance with this invention will be capable of taking a charge of no more than about one-third that of unmodified ethyl cellulose or similarly plasticized ethyl cellulose sheeting containing no nitrocellulose under like conditions, and in its best form will take a substantially zero charge. Forces due to static are thereby reduced to one-ninth or practically zero, and freedom from other disadvantages hereinbefore mentioned is achieved.

Where the viscosity of ethyl cellulose is herein referred to, there is meant the viscosity in centipoises at 25° C. of a solution consisting of 5 parts of ethyl cellulose and 95 parts of solvent, the composition of the solvent being 70 parts toluene and 30 parts ethyl alcohol for ethyl celluloses having an ethoxyl content below 46.8%, and 80 parts toluene and 20 parts ethyl alcohol for ethyl celluloses having an ethoxyl content above 46.8%, all parts being by weight. Where the viscosity of nitrocellulose is referred to, there is meant the viscosity at 25° C. of a 12.2% solution of the nitrocellulose in a solvent consisting of 25% ethyl alcohol, 20% ethyl acetate, and 55% toluene (all by weight). In this case the viscosity is expressed in seconds required for a $\frac{1}{16}$ inch steel ball to fall 10 inches through the solution while the solution is confined in a glass tube having an inside diameter of 0.984 inch.

It will be understood that the details and examples hereinbefore set forth are illustrative only and that the invention as broadly described and claimed is in no way limited thereby.

What I claim and desire to protect by Letters Patent is:

1. Self-supporting, flexible cellulosic sheeting comprising interdispersed ethyl cellulose having an ethoxyl content between about 40% and about 53% and a viscosity above about 90 centipoises and nitrocellulose having a nitrogen content between about 10.9% and about 12.6% and a viscosity above about 4 seconds in a ratio between about 70 parts of ethyl cellulose to 30 parts of nitrocellulose and about 90 parts of ethyl cellulose to 10 parts of nitrocellulose, the said sheeting being characterized by low capacity for taking static charges.

2. Self-supporting, flexible cellulosic sheeting comprising interdispersed ethyl cellulose having an ethoxyl content between about 40% and about 53% and a viscosity above about 90 centipoises and nitrocellulose having a nitrogen content between about 10.9% and about 12.6% and a viscosity above about 4 seconds in a ratio between about 70 parts of ethyl cellulose to 30 parts of nitrocellulose and about 90 parts of ethyl cellulose to 10 parts of nitrocellulose, the ethyl cellulose and nitrocellulose being adjusted in proportion to their point of static neutrality, such sheeting being characterized by substantially no capacity for taking a static charge.

3. A photographic film with a supporting base comprising interdispersed ethyl cellulose having an ethoxyl content between about 40% and about 53% and a viscosity above about 90 centipoises and nitrocellulose having a nitrogen content between about 10.9% and about 12.6% and a viscosity above about 4 seconds in a ratio between about 70 parts of ethyl cellulose to 30 parts of nitrocellulose and about 90 parts of ethyl cellulose to 10 parts of nitrocellulose, the said film being characterized by low capacity for taking static charges.

4. A photographic film with a supporting base comprising interdispersed ethyl cellulose having an ethoxyl content between about 40% and about 53% and a viscosity above about 90 centipoises and nitrocellulose having a nitrogen content between about 10.9% and about 12.6% and a viscosity above about 4 seconds in a ratio between about 70 parts of ethyl cellulose to 30 parts of nitrocellulose and about 90 parts of ethyl cellulose to 10 parts of nitrocellulose, the ethyl cellulose and nitrocellulose being adjusted in proportion to their point of static neutrality, the said film being characterized by substantially no capacity for taking a static charge.

5. A self-supporting, flexible wrapping foil comprising interdispersed ethyl cellulose having a viscosity above about 90 centipoises and nitrocellulose having a viscosity above about 4 seconds in a ratio between about 70 parts of ethyl cellulose to 30 parts of nitrocellulose and about 90 parts of ethyl cellulose to 10 parts of nitrocellulose, the said foil being characterized by low capacity for taking static charges.

6. A self-supporting, flexible wrapping foil comprising interdispersed ethyl cellulose having a viscosity above about 90 centipoises and nitrocellulose having a viscosity above about 4 seconds in a ratio between about 70 parts of ethyl cellulose to 30 parts of nitrocellulose and about 90 parts of ethyl cellulose to 10 parts of nitrocellulose, the ethyl cellulose and nitrocellulose being adjusted in proportion to their point of static neutrality, the said foil being characterized by substantially no capacity for taking a static charge.

7. Self-supporting, flexible cellulosic sheeting comprising interdispersed ethyl cellulose having a viscosity above about 90 centipoises and nitrocellulose having a viscosity above about 4 seconds in a ratio between about 70 parts of ethyl cellulose to 30 parts of nitrocellulose and about 90 parts of ethyl cellulose to 10 parts of nitrocellulose, and a plasticizer for the said cellulosic combination, the said sheeting being characterized by low capacity for taking static charges.

8. Self-supporting, flexible cellulosic sheeting comprising interdispersed ethyl cellulose having a viscosity above about 90 centipoises and nitrocellulose having a viscosity above about 4 seconds in a ratio between about 70 parts of ethyl cellulose to 30 parts of nitrocellulose and about 90 parts of ethyl cellulose to 10 parts of nitrocellulose and a plasticizer for the said cellulosic combination, the ethyl cellulose and nitrocellulose being adjusted in proportion to the point of static neutrality for the film, the said sheeting being characterized by substantially no capacity for taking a static charge.

9. A method for the preparation of tough, self-supporting, flexible sheeting having substantially no capacity for taking a static charge which comprises preparing a plurality of films comprising ethyl cellulose of a lot with a viscosity above about 90 centipoises and nitrocellulose having a viscosity above about 4 seconds, the films having compositions varying in increments between a 70-30 ratio and a 90-10 ratio of the ethyl cellulose to the nitrocellulose; treating the prepared films by friction with a non-conductor under uniform conditions normally generating static upon cellulose derivative film; measuring the static charges generated and determining thereby the composition of static neutrality for the particular ethyl cellulose and nitrocellulose utilized; and preparing sheeting having substantially the statically neutral composition determined.

10. A method for the preparation of tough, self-supporting, flexible sheeting having substantially no capacity for taking a static charge which comprises preparing a plurality of films comprising ethyl cellulose of a lot with a viscosity above about 90 centipoises, nitrocellulose having a viscosity above about 4 seconds, and a plasticizer, the films having compositions varying in increments between a 70-30 ratio and a 90-10 ratio of the ethyl cellulose to the nitrocellulose; treating the prepared films by friction with a non-conductor under uniform conditions normally generating static upon cellulose derivative film; measuring the static charges generated and determining thereby the composition of static neutrality for the particular ethyl cellulose and nitrocellulose utilized; and preparing sheeting having substantially the statically neutral composition determined.

JOHN K. SPEICHER.